United States Patent [19]

Holston et al.

[11] Patent Number: 4,858,204
[45] Date of Patent: Aug. 15, 1989

[54] UNDERWATER SIGNALLING DEVICE

[76] Inventors: Robert W. Holston, 1605 N. Roosevelt Blvd., Key West, Fla. 33040; Thomas H. Halford, 1508 Duncan St., Key West, Fla. 33040

[21] Appl. No.: 317,365

[22] Filed: Mar. 1, 1989

[51] Int. Cl.$^4$ .................. H04B 11/00; G10K 1/34
[52] U.S. Cl. .................... 367/141; 367/191; 181/0.5; 181/402; 116/172; 116/26; 405/186
[58] Field of Search ............... 181/0.5, 142, 400, 401, 181/402; 367/141, 191, 910; 116/1, 21, 26, 27, 43, 148, 155, 163, 167, 172, 201, 203, 205, DIG. 1, DIG. 12, DIG. 18, DIG. 19, DIG. 43; 267/166, 170, 173, 174, 179, 180, 182; 405/185, 186, 187, 303; 441/11, 136

[56] References Cited

U.S. PATENT DOCUMENTS

| | | | |
|---|---|---|---|
| 1,109,811 | 9/1914 | Wood | 116/27 |
| 3,068,835 | 12/1962 | Stewart | 116/148 |
| 3,144,171 | 8/1964 | Gagnan | 367/191 |
| 3,734,054 | 5/1973 | Anderson | 116/148 |
| 4,095,667 | 6/1978 | Mahig et al. | 367/910 |
| 4,498,878 | 2/1985 | Shieh | 405/186 |

Primary Examiner—Brian S. Steinberger
Attorney, Agent, or Firm—Jesus Sanchelima

[57] ABSTRACT

An underwater signaling device being removably mounted to the strap commonly found in scuba diving tanks. The device includes two elongated members an one of them being removably secured to the strap while the other one, hingedly mounted to the first one, is urged towards the latter by the spring action of the wound common ends connecting each other. A solid mass is rigidly mounted to the movable elongated member and an impact receiving plate is mounted to the fixed elongated member so that when the movable member is released the impact is taken by the plate and not directly by the tank.

6 Claims, 1 Drawing Sheet

UNDERWATER SIGNALING DEVICE

BACKGROUND OF THE INVENTION

1. Field of the Invention.

The present invention relates to underwater signalling devices.

2. Description of the Related Art.

Applicant believes that the closest reference corresponds to U.S. Pat. No. 3,144,171 issued to E. Gagnan et al. However, it differs from the present invention because it utilizes the air contained in the tank to activate device 16 when actuated. Conceivably, the air pressure in the tank will determine whether the device will operate and to magnitude of the signal generated.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an underwater signalling device that can be repeatedly used by a diver to generate a sufficiently strong signal to alert his companions around him.

It is another object of this present invention to provide such a device that is readily accessible and reliable.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
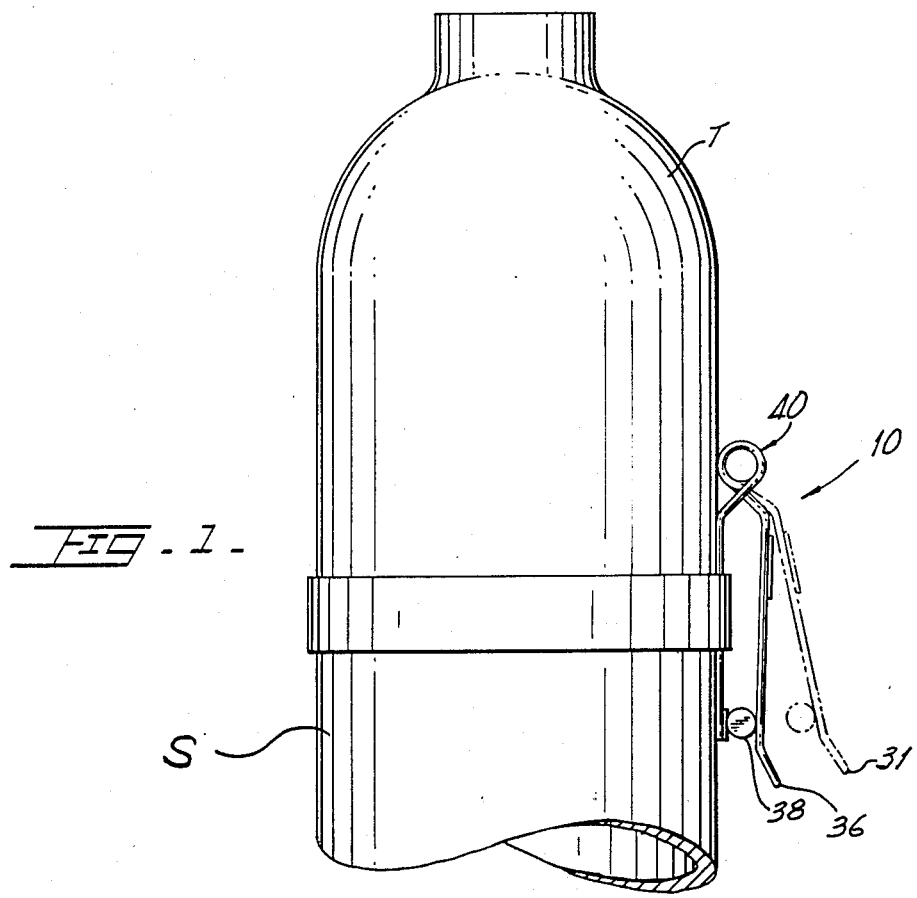
FIG. 1 represents a side view of the present invention mounted to a scuba diving tank and held in place by the strap conventionally found in these tanks.

Referring now to FIG. 1, where the present invention is generally referred to with numeral 10, it can be observed that it basically includes a pair of short leg or elongated members 20 and a pair of preferably longer leg or elongated members 30 that are connected to each other, and in fact constitutes part of each other, at one end 40. As it can be seen short pair of legs 20 is removably inserted between tank "T" and strap "S" that is commonly found in the scuba tanks.

Figure 2:
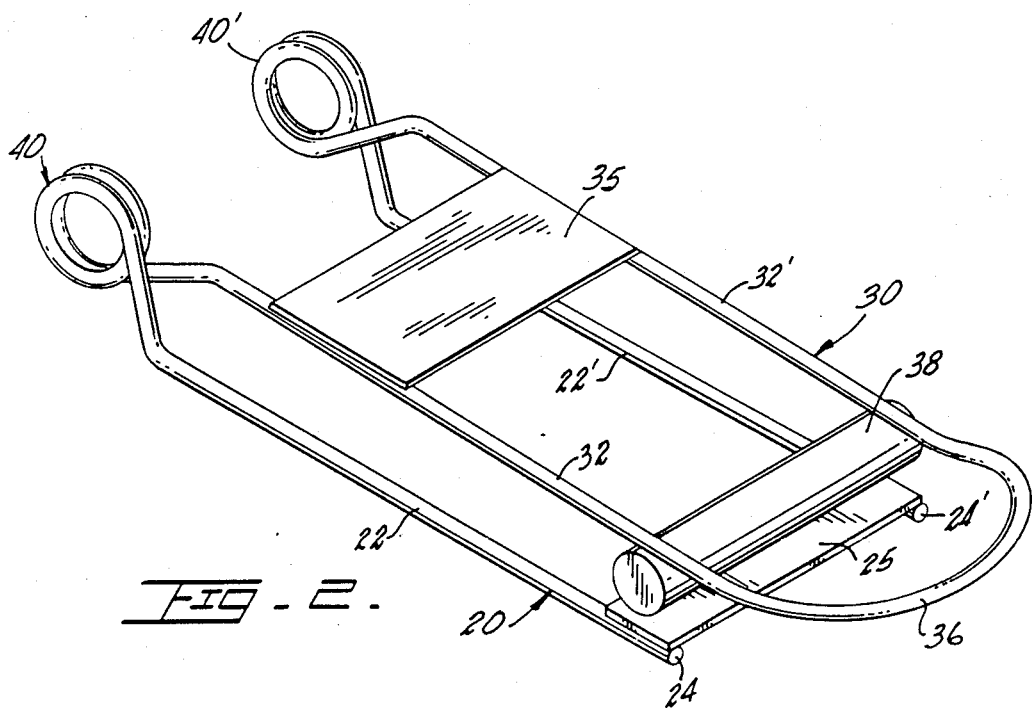
FIG. 2 shows a view in perspective of the signaling device subject of the present application.

As best shown in FIG. 2, short and long pair of legs 20 and 30 include short elongated members 22 and 22' parallel to each other and long elongated members 32 and 32' also parallel to each other. Members 32 and 32' are connected to each other by curved lifted portion 36. Curved lifted portion 36 is the approximate center of the raw wire used to build device 10 which includes would ends 40 and 40' and terminates with short elongated members 22 and 22' connected together by contact plate 25. Contact plate 25 is preferably soldered to the ends 24 and 24' of short elongated member 22 and 22'. Contact plate 25 is intended to receive the impact of rod member 38 which is also preferably soldered to long elongated members 22 and 22'. In this manner the impact is not absorbed by tank "T" directly. When curved lifted portion 36 is manually retracted to position 31 and released, the spring action causes rod member 38 to hit plate 25 which is, when the device is mounted, in contact with tank "T". The vibration caused by the impact of the mass of rod member 38 against plate 25 is transmitted to tank "T" which acts as an amplifier of the audible signal generated and transmitted. It has been found that the signal generated in this fashion has been heard underwater at a distance as far as 50 feet.

Optionally, legend plate 35 is mounted between long elongated members 32 and 32' at a point between wound ends 40 and 40' and rod member 38. Preferably, plate 35 is soldered to legs 32 and 32' and it will be of an attractive material to display a message, logo or any other information.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. An underwater signaling device removably mounted between the tank and the strap holding the tank, comprising:
   A. first rigid elongated member, having two ends, removably inserted between said tank and said strap;
   B. Second rigid elongated member, having two ends, hingedly connected at one end to one of the ends of said first elongated member and further including a solid mass mounted substantially at the other end of said second elongated member so that when said first and second elongated members are urged toward each other said solid mass comes in contact with said tank; and
   C. spring means for urging said first and second elongated members toward each other so that said second member can be retracted and released by the user causing said solid mass to impact against said tank thereby producing sound.

2. The signaling device set forth in claim 1 wherein said solid mass has substantially a cylindrical shape.

3. The signaling device set forth in claim 2 wherein said first elongated member includes a plate member that receives the impact of said cylindrical solid mass.

4. The signaling device set forth in claim 3 wherein said first and second elongated members are first and second pairs of wire legs and each leg of said pair kept in a spaced apart and parallel relationship with respect to each other.

5. The signaling device set forth in claim 4 wherein said first and second pairs of wire are made out of one piece of continuous wire and said spring means are implemented by the wounding of said wire on the ends where said first and second pairs' ends are hingedly mounted to each other.

6. The signaling device set forth in claim 5 further comprising:
   D. A legend plate member rigidly mounted between said second pair of legs so that information can be readily displayed thereon.

* * * * *